(12) United States Patent
Chiou et al.

(10) Patent No.: US 8,464,954 B2
(45) Date of Patent: Jun. 18, 2013

(54) METHOD OF IMPROVING THE BARCODE RECOGNITION EFFICIENCY USING CONTINUOUS SAMPLING, COMPUTER READABLE MEDIUM, AND BARCODE RECOGNITION APPARATUS

(75) Inventors: Hann-Huei Chiou, Taipei (TW); Pan-Lung Tsai, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 311 days.

(21) Appl. No.: 12/889,946

(22) Filed: Sep. 24, 2010

(65) Prior Publication Data

US 2011/0073650 A1 Mar. 31, 2011

(30) Foreign Application Priority Data

Sep. 25, 2009 (CN) .......................... 2009 1 0175758
Aug. 11, 2010 (CN) .......................... 2010 1 0257214

(51) Int. Cl.
| G06K 7/10 | (2006.01) |
| G06K 19/06 | (2006.01) |
| G06K 9/00 | (2006.01) |
| G06K 9/62 | (2006.01) |

(52) U.S. Cl.
USPC ................ 235/462.07; 235/462.01; 235/494; 382/140; 382/209

(58) Field of Classification Search
USPC ................ 235/462.01–462.49, 494; 382/140, 382/209
See application file for complete search history.

(56) References Cited

U.S. PATENT DOCUMENTS

| 5,739,518 A * | 4/1998 | Wang ........................ 235/462.09 |
| 2008/0029602 A1* | 2/2008 | Burian et al. ............ 235/462.09 |

FOREIGN PATENT DOCUMENTS

TW 200841686 10/2008

* cited by examiner

*Primary Examiner* — Michael G Lee
*Assistant Examiner* — Laura Gudorf (57) ABSTRACT

A method of improving multi-type barcode recognition efficiency using continuous sampling is applicable to a barcode recognition apparatus. According to the method, each barcode type is given with a corresponding weight value, and a total weight threshold is set in the barcode recognition apparatus. A barcode pattern is sampled with a limited number of times, and each sampled image sample is only compared with a part of the supported barcode types. When the comparison matches, a weight value is assigned to the matched barcode type, and the weight value is accumulated to acquire a total weight value of the matched barcode type. When comparison of all image samples is finished, the barcode type with the total weight value reaching the total weight threshold is the barcode type of the barcode pattern, and a recognition result of the barcode pattern is output according to the barcode type.

22 Claims, 4 Drawing Sheets

| | Barcode A | Barcode B | Barcode C | Barcode D | Barcode E (Self-Checking) | Barcode F (Self-Checking) |
|---|---|---|---|---|---|---|
| Sample 1-1 | 10 | X | X | | | |
| Sample 1-2 | | | | X | X | X |
| Sample 1-3 | 10 | | 10 | | X | X |
| Sample 1-4 | | X | | X | | |
| Sample 1-5 | X | X | | X | | X |
| Sample 1-6 | | | X | X | X | |
| Sample 1-7 | 10 | X | X | | | X |
| Sample 1-8 | | | | | 60 | |
| Total Weight Value | 30 | | 10 | | 60 | |

METHOD OF IMPROVING THE BARCODE RECOGNITION EFFICIENCY USING CONTINUOUS SAMPLING, COMPUTER READABLE MEDIUM, AND BARCODE RECOGNITION APPARATUS

CROSS-REFERENCES TO RELATED APPLICATIONS

This non-provisional application claims priority under 35 U.S.C. §119(a) on Patent Application Nos. 200910175758.8 and 201010257214.9 filed in China on Sep. 25, 2009 and Aug. 11, 2010, the entire contents of which are hereby incorporated by reference.

BACKGROUND OF THE INVENTION

1. Field of Invention

The present invention relates to a barcode recognition method and a barcode recognition apparatus, and more particularly to a method of improving multi-type barcode recognition efficiency using continuous sampling, a computer readable medium, and a barcode recognition apparatus.

2. Related Art

A linear barcode contains black and white bar blocks arranged at intervals. On the basis of barcode protocol, a width of each bar block and an arrangement of black and white combination of bar blocks represent different numbers and letters. The number and letter combination represented by the aforementioned width and black and white combination of bar blocks are different according to the code protocols.

Currently, there are two common methods for recognizing the barcode pattern. In the first method, the entire barcode pattern is captured, and complex numerical operation is performed on the entire pattern through complex image processing method to discover the barcode pattern area in the captured image. For example, R.O.C. (Taiwan) Invention Patent No. 1309390, entitled "BARCODE RECOGNITION SYSTEM AND BARCODE RECOGNITION METHOD USING DIGITAL CAMERA" provides a barcode recognition system using a digital camera, which at least includes a digital camera, a barcode pattern database, an image recognition device, and a decoder. The digital camera captures and stores image data of the barcodes. The barcode pattern database stores a plurality of pre-determined barcode feature data. The image recognition device recognizes and modifies the barcode pattern by the barcode feature data. The decoder performs the decoding operation on the barcode pattern according to the barcode feature data.

However, the method of processing the entire barcode pattern needs additional hardware resources. Using a handheld operation device with relatively low hardware performance, this method requires considerable operation time. Meanwhile, the sampling quality of the image shot by a camera lens is often affected by external factors such as image blur caused by lens vibration, incomplete sampling caused by lens shifting, and image skew caused by the improper sampling angle between the lens and the barcode, and the poor image quality may cause a comparison failure for the binary sequence generated after binarization and may even cause misjudgment.

However, the method of processing the entire barcode pattern consumes lots of hardware resources. To a handheld data processing device with relatively low hardware performance, this method requires considerable operation time. Meanwhile, the sampling quality of the image captured by the camera is often affected by external factors, such as image blur caused by lens vibration, incomplete sampling caused by lens shifting, and image skew caused by the improper sampling angle between the lens and the barcode pattern. The poor image quality may cause a comparison failure for the binary sequence generated after binarization and may even cause misjudgment.

The second method is mainly directed to a linear barcode. A scan line is taken from the barcode pattern through all the bar blocks of the barcode pattern, the image is processed and binarization process is performed only on the scan line, and the barcode is decoded after a binary array is generated. In this method, only one scan line is processed, therefore the barcode recognition efficiency is optimized. However, one single scan line may contain a portion that cannot be binarized due to poor sampling quality, so the decoding result of the barcode cannot pass checksum verification. Particularly for a long barcode, for example, a barcode containing multiple sections, there is an increased probability that the recognition result cannot pass the checksum verification due to recognition errors of a single barcode data character. As long as a recognition error occurs with regard to any barcode data character or a certain bar cannot be imaged clearly, the recognition result cannot pass checksum verification, so this scanning result is directly abandoned and next scanning and recognizing has to be performed. If the barcode pattern has an undesirable quality, the scanning and recognizing are repeated additional times, requiring considerable additional scanning time.

In addition to these problems, a barcode protocol (or referred to as a barcode type), of a barcode pattern to be read is usually unable to be determined. Therefore, when the barcode pattern is being read, the barcode reader device usually must read the barcode pattern repeatedly according to different barcode protocols until a certain barcode protocol is applicable for reading the barcode pattern. Alternatively, when the barcode pattern cannot be read after several continuous reading cycles, it is determined that the barcode pattern is unreadable.

In addition to these problems, a barcode protocol (or referred to as a barcode type) of a barcode pattern to be read is usually unable to be determined by a user. Therefore, when the barcode pattern is being recognized, the barcode recognition apparatus usually must recognizes the barcode pattern repeatedly according to different barcode protocols until a certain barcode protocol is applicable for recognizing the barcode pattern. Alternatively, when the barcode pattern cannot be recognized after several continuous recognition cycles, it is determined that the barcode pattern is unreadable.

Where barcode patterns of multiple barcode types are used, the barcode recognition apparatus repeatedly recognizes the barcode pattern according to different barcode protocols. In both the first and second barcode recognition method referred to previously, considerable hardware resources are consumed. Furthermore, the barcode recognition apparatus is usually a handheld data processing device relatively lacking in hardware resources, so if the reading of multiple barcode types is supported at the same time and the barcode types can be automatically determined, the recognition rate of the barcode recognition apparatus is low. Therefore, for the handheld data processing device serving as the barcode recognition apparatus, the number of supported barcode types must be reduced, or the function of the determining the barcode types automatically must be abandoned, so the user sets the barcode protocol used in each scanning and recognition.

SUMMARY OF THE INVENTION

The barcode recognition method in the prior art may has problems such as comparison failures or misjudgment due to undesirable barcode pattern quality. Furthermore, where recognizing of multi-type barcodes is supported, the problem of low recognition rate may also result.

In view of the aforementioned problems, the present invention provides a method of improving a multi-type barcode recognition efficiency using continuous sampling, for sampling a barcode image multiple times and determining one of a plurality of barcode types of the barcode pattern and the corresponding barcode information. The method includes the following steps:

The first step is to determine a weight value obtained when a comparison between each barcode type and the barcode pattern matches, and to determine a total weight threshold. And then, it is to sampling the barcode pattern multiple times to obtain a plurality of image samples. The next, for each image sample, is to determine the barcode type of each image sample, and to assign a weight value to the barcode type according to the barcode type of each image sample, and to accumulate the weight value to acquire a total weight value of the barcode type. Finally, is to determine the barcode type with a total value reaching the total weight threshold as the barcode type of the barcode pattern, and to output a recognition result of the barcode pattern according to the barcode type.

The present invention further provides a barcode recognition apparatus for sampling a barcode image multiple times and determining one of a plurality of barcode types of the barcode pattern and the corresponding barcode information. The barcode recognition apparatus includes an image capture module, a data storage device, and a control module. The image capture module continuously captures images of the barcode pattern as a plurality of image samples, while the data storage device caches the image samples. The data storage device further stores at least a barcode recognition program, a weight value obtained when comparison between each barcode type and the barcode pattern matches, and a total weight threshold. The control module loads and executes the barcode recognition program from the data storage device to control the image capture module to start to capture the image samples and send the captured images to the control module. The control module obtains a plurality of image samples from the image capture module to determine the barcode type of each image sample; according to the barcode type of each image sample, provides a weight value to the barcode type and accumulates the weight value to acquire a total weight value of the barcode type; and determines the barcode type with a total value reaching the total weight threshold as the barcode type of the barcode pattern and according to the barcode type, and outputs a recognition result of the barcode pattern.

For the method of improving recognition efficiency and barcode recognition apparatus according to the present invention, multi-type barcode recognition is performed on the images sampled multiple times, and it is determined whether the barcode type and barcode information are successfully recognized based on the weight value and the total weight value, so as to improve the correct rate and reliability of barcode recognition, in order to avoid the problems of recognition failures or misjudgment caused by undesirable image quality when the barcode is recognized through a single static image. Meanwhile, in each sampling procedure, the barcode recognition is performed only on a part of the barcode types instead of all the supported barcode types, so barcode recognition efficiency may be improved effectively.

The technical schemes and embodiments of the present invention are illustrated in detail below with reference to the accompanying drawings, and the contents are sufficient for persons skilled in the art to understand the technical contents of the present invention and implement the present invention accordingly.

BRIEF DESCRIPTION OF THE DRAWINGS

The present invention will become more fully understood from the detailed description given herein below for illustration only and thus not limitative of the present invention, wherein.

DETAILED DESCRIPTION OF THE INVENTION

Figure 1:
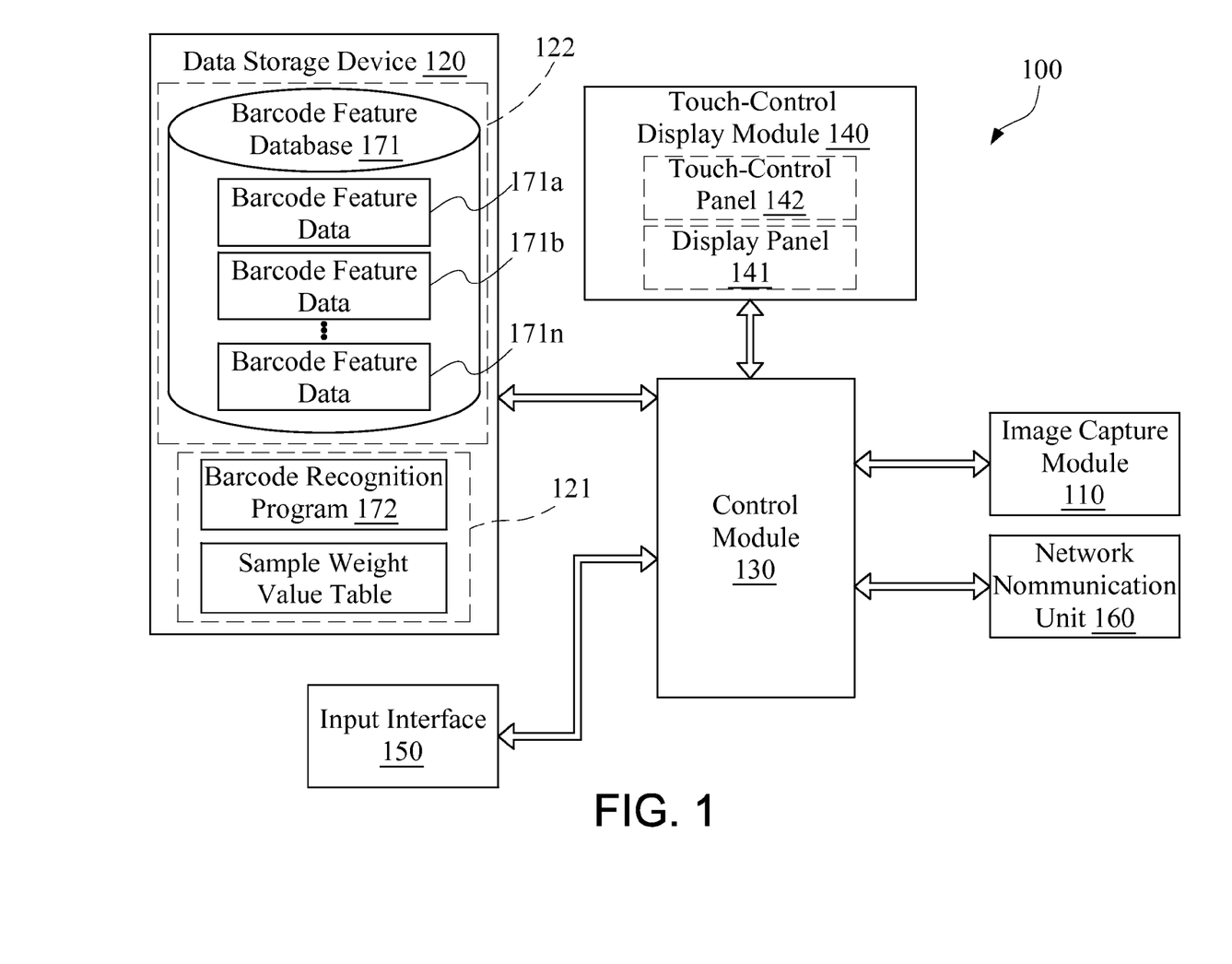
FIG. 1 is a circuit block diagram of a barcode recognition apparatus according to an embodiment of the present invention.

FIG. 1 is a circuit block diagram of a barcode recognition apparatus 100 according to an embodiment of the present invention. The barcode recognition apparatus 100 performs the method of improving a multi-type barcode recognition efficiency using continuous sampling of the present invention, so as to determine one of a plurality of barcode types of the barcode pattern and the corresponding barcode information. The barcode recognition apparatus 100 is a handheld data processing device, such as a personal digital assistant (PDA), a portable navigation device (PND) or a smart phone. The barcode recognition apparatus 100 is not limited to a handheld data processing device and may also be a desktop computer or laptop computer.

The barcode recognition apparatus 100 according to an embodiment of the present invention takes a handheld data processing device as an illustration.

The barcode recognition apparatus 100 includes an image capture module 110, a data storage device 120, a control module 130, a touch-control display module 140, an input interface 150 and a network communication unit 160.

As shown in FIG. 1, the image capture module 110 continuously captures images of the barcode pattern as a plurality of image samples. The image capture module 110 is a cam/camera which utilizes a complementary metal oxide semiconductor (CMOS) or a charge coupled device (CCD), and preferably a cam/camera having high resolution capability (for example, having a resolution capability above over 1 million pixels) and having an autofocus function for capturing images clearly. A multiple sampling mode may be a dynamic photographing mode, that is, the image capture module 110 continuously captures images of the barcode pattern at a fixed number of frames per second to form a dynamic image, and the dynamic image is split into a plurality of continuously captured image frames obtained through multiple sampling as the sampled image samples.

The data storage device 120 caches the sampled image samples captured by the image capture module 110, a barcode feature database 171, and a barcode recognition program 172. The barcode feature database 171 has a plurality of barcode feature data 171$a$ to 171$n$, and each of the barcode feature data 171$a$ to 171$n$ corresponds to one barcode type. The data storage device 120 also stores relevant data set or generated during the barcode recognition, such as a weight value obtained when comparison between each barcode type and the barcode pattern matches, the sampling number M of image samples, a total weight threshold, and a barcode recognition result.

The specification of the data storage device 120 varies according to different types of the barcode recognition apparatus 100, and the data storage device 120 substantially includes a program memory 121 and a storage memory 122. The program memory 121 and the storage memory 122 can be two separated storage modules. The data storage device 120 can be a single storage module, which is divided into two different storage partitions, namely a program memory 121 and a storage memory 122 after being partitioned. Taking a handheld data processing device as an example, the program memory 121 is usually a random access memory for storing an operating system and important resident program, and serves as a space for the handheld data processing device to load and execute programs. The storage memory 122 is a built-in or external NAND Flash memory for storing general data or non-resident general program files.

The handheld data processing device is taken as an example in the embodiment of the present invention. If the barcode recognition apparatus 100 is a common personal computer, the program memory 121 and the storage memory 122 can be respectively a system memory and a hard disk, and the operating system and important resident programs are installed and stored in the hard disk serving as the storage memory 122.

The control module 130 includes a processor, a system logic chipset, and a display interface, and the control module 130 is provided for processing digital data. The processor and system logic chipset can be the combination of multiple electronic components independently disposed on a circuit board, or the processor and system logic chipset can be integrated into a system-on-a-chip (SoC). The control module 130 applied in the handheld data processing device is usually a system SoC. The image capture module 110 is electrically coupled to the control module 130, such that the image capture module 110 is controlled by the control module 130 to capture images and send the images to the control module 130. The data storage device 120 is also electrically coupled to the control module 130, such that the control module 130 accesses data from the data storage device 120. The control module 130 loads and executes a barcode recognition program 172 from the data storage device 120 to control the image capture module 110 to start to capture the image samples and to send the captured images to the control module 130.

The touch-control display module 140 receives the display signals sent by the control module 130 through the display interface to display an image frame, and the touch-control display module 140 is touched to generate an operation instruction serving as the operation instruction of the barcode recognition apparatus 100. The touch-control display module 140 includes a display panel 141 and a touch-control panel 142 disposed on the display panel 141. The display panel 141 receives the display signals of the control module 130 to display the image frames. The touch-control panel 142 is combined with the display panel 141 and is touched to send a corresponding operation instruction to the control module 130.

The input interface 150 is electrically connected to the control module 130 for sending the operation instruction to the control module 130. The network communication unit 160 is connected to the control module 130 for connection to an external network.

Figure 2:
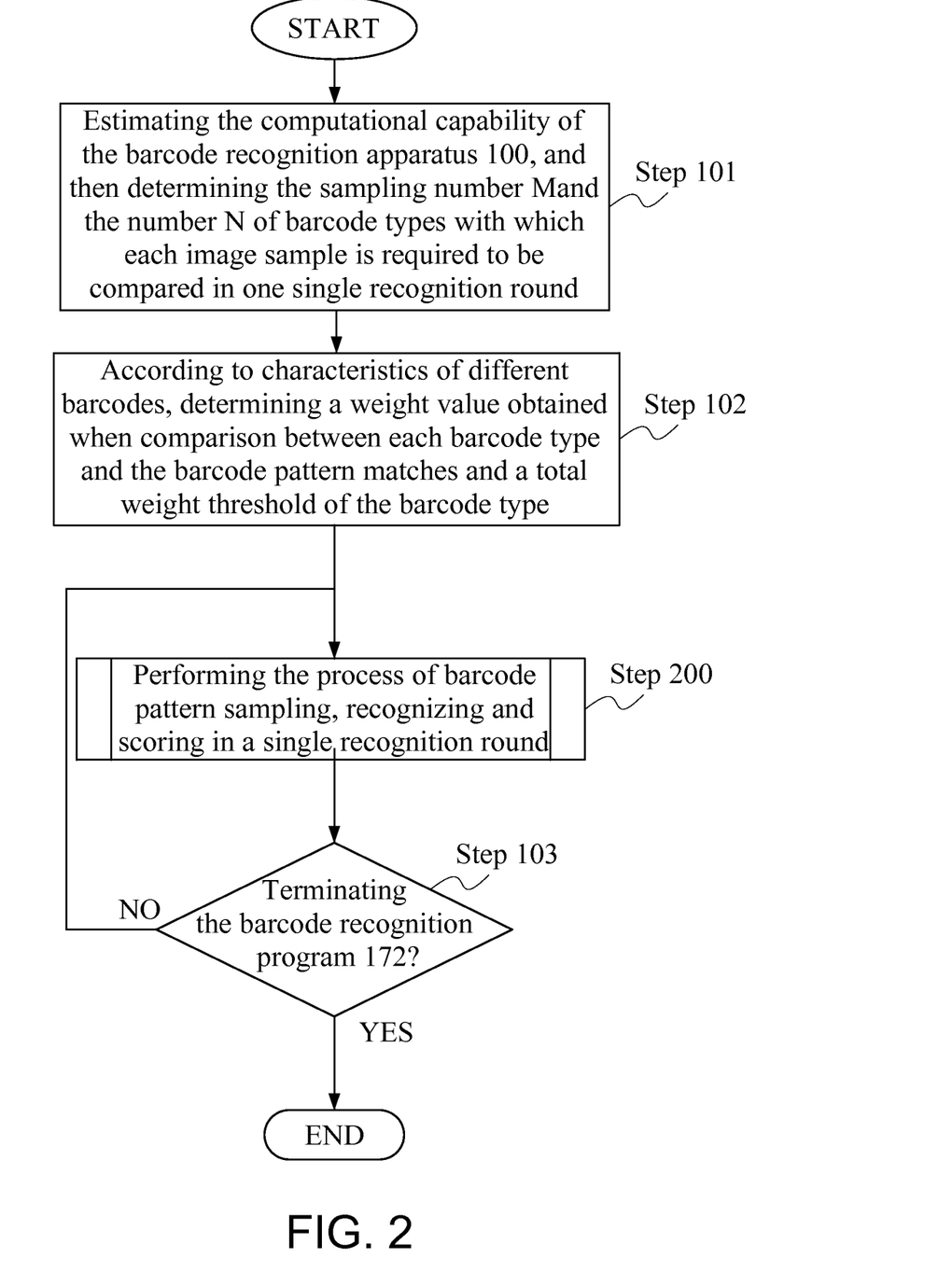
FIG. 2 is a flow chart of a barcode recognition method using continuous sampling to improve a multi-type barcode recognition efficiency according to the present invention.

As shown in FIGS. 1 and 2, when the barcode recognition apparatus 100 is adopted to implement the barcode recognition method of the present invention, the control module 130 of barcode recognition apparatus 100 loads and executes the barcode recognition program 172 from the data storage device 120 at first, so as to control the image capture module 110 to start to capture images through multiple sampling and to send the captured images to the control module 130. A dynamic photographing mode of the image capture module 110 is substantially the characteristic of continuously sampling single images multiple times per second (15 to 30 image frames per second). The dynamic photographing mode includes multiple sampling of a barcode pattern to obtain a plurality of single image frames as a plurality of sampled image samples. Of course, a general photographing mode may also be adopted so that the image capture module 110 continuously captures multiple single photos of the barcode pattern to obtain a plurality of single photos as a plurality of sampled image samples.

As shown in FIG. 2, in order to effectively utilize the hardware resource of the barcode recognition apparatus 100 and maintain a good barcode recognition efficiency, after loading and executing a barcode recognition program 172 from the data storage device 120, the control module 130 has to estimate the computational capability of the barcode recognition apparatus 100 in advance to confirm the system resource of the barcode recognition apparatus 100 for barcode recognition in the current software environment and hardware configuration. For example, one of the approaches is that the control module 130 executes a simple program loop, and the time that the control module 130 completes the simple program loop is used to estimate the computational capability of barcode recognition apparatus 100 currently.

Next, according to the computational capability of the barcode recognition apparatus 100, the control module 130 determines the sampling number M of the image samples and the number N of barcode types with which each image sample is required to be compared in one single recognition round (Step 101). The purpose of determining the sampling number M of the samples and the number N of barcode types is to complete one single recognition round within a reasonable program response time (for example, 400 ms).

That is to say, if the total number of the barcode types that are supported and readable by the barcode recognition apparatus 100 is L, the barcode recognition apparatus 100 is not required to compare L barcode types with each image sample, and instead only N barcode types among the L barcode types are compared. For example, when N is set to be L/2 or L/3, that is, the image barcode recognition apparatus 100 only compares ½ or ⅓ of the total number L of the supported barcode types with each image sample.

For example, in FIG. 1, the sum of the barcode feature data 171a to 171n in the barcode feature database 171 is the total number L of the barcode types. Not every compared barcode type in each sampling includes a barcode type corresponding to one of the barcode feature data 171a to 171n, and only N barcode types are taken. The number N of barcode types to be recognized in each sampling can be determined by the barcode recognition apparatus 100 in a random mode or is determined by the user. In the example that the number is determined by the user, after confirming the list of the barcode feature data 171a to 171n in the barcode feature database 171, the control module 130 generates an image signal to drive the display panel 141 of the touch-control display module 140 to display all the corresponding barcode types in the barcode feature database 171, and then the user selects the barcode type.

Then, based on the computational capability and with reference to an average time for comparison with one of the N barcode types, the barcode recognition apparatus 100 may further determine the sampling number M of the samples in a single recognition round. In this mode, the reasonable program response time (for example, 400 ms), is firstly determined, and a relation between the sampling number M of the samples in a single recognition round and the reasonable program response time satisfies:

(the sampling number M of the samples)×the number N of barcode types with which each image sample needs to be compared)×an average time for comparison between each image sample and a barcode type)<a reasonable program response time Next, according to characteristics of different barcodes, the control module 110 of the barcode recognition apparatus 100 determines a weight value obtained when comparison between each barcode type and the barcode pattern matches and a total weight threshold of the barcode type, as shown in Step 102.

A probability that an error occurs when the barcode recognition apparatus 100 recognizes each barcode type differs. The so-called error recognition represents barcode information or a barcode type obtained by the barcode recognition apparatus 100 being inconsistent with those of the barcode pattern after the barcode recognition apparatus 100 completes the assessment of the barcode type and the recognizing of the barcode information.

The data code of some barcode types such as European Article Number (EAN), contains at least a checksum for the barcode recognition apparatus 100 to perform a self-check to confirm that the barcode information or barcode type obtained by the barcode recognition apparatus 100 is correct. Even when some bytes in the barcode information code are incorrect or missing, the checksum can be used to perform reverse encoding to correct the incorrect or the missing bytes. However, a barcode with this self-checking function may adopt other self-checking mechanisms other than the self-checking mechanism with the checksum. To a barcode type without the self-checking function, it is difficult to determine whether or not the barcode information obtained by the barcode recognition apparatus 100 is true.

In Table 1, some common barcode types are listed, and the barcode types are classified on the basis of whether or not the barcode type has the self-checking function.

TABLE 1

| WITHOUT SELF-CHECKING FUNCTION | HAVING SELF-CHECKING FUNCTION | |
| --- | --- | --- |
| | WITHOUT CHECKSUM | HAVING CHECKSUM |
| Code 11, MSI | Codebar, Code 25, Code 39 | Code 128, Code 93, EAN/JAN/UPC, GS1 Data Bar, 2D Barcodes |

As shown in Table 1, for a barcode type with a self-checking function, the probability that the barcode recognition apparatus 100 gives a correct recognition result of the barcode information or barcode type is relatively high, so the barcode recognition apparatus 100 is defined as having relatively high recognition result reliability. Similarly, among barcode types with a self-checking function, the barcode type with a checksum has higher recognition result reliability than that of the barcode type without the checksum. Therefore, the reliability of the recognition results of Code 128, Code 93, EAN/JAN/UPC, GS1 Data Bar, 2D Barcodes in Table 1 given by the barcode recognition apparatus 100 is higher than that of the Codebar, Code 25, Code 39.

With regard to a barcode without the self-checking function, the probability that the barcode recognition apparatus 100 gives a correct recognition result of barcode information or barcode type is relatively low, so the barcode recognition apparatus 100 is defined to have a relatively low reliability of recognition results to these types of barcodes. The reliability of the recognition results of Code 11 and MSI in Table 1 given by the barcode recognition apparatus 100 is therefore relatively low.

As described above, the reliability may be defined as the correct probability of the recognition result after the barcode recognition apparatus 100 recognizes a barcode pattern or a parameter highly positively correlated to the correct probability.

After the reliability of the recognition result is determined on the basis of the correct probability of each barcode type, the barcode recognition apparatus 100 further defines a weight value obtained each time the barcode recognition apparatus 100 successfully recognizes each barcode type. A barcode type having a high reliability has a relatively high weight value, and a barcode type having a low reliability has a relatively low weight value.

For example, when the barcode types supported by the barcode recognition apparatus 100 includes all the barcode types listed in Table 1, the barcode types in Table 1 may be classified into three groups. The first group includes barcode types having the highest weight value, namely Code 128, Code 93, EAN/JAN/UPC, GS1 Data Bar, 2D Barcodes having the self-checking function and the checksum. The second group includes barcode types having the medium weight value, namely Codebar, Code 25, Code 39 having the self-checking function but having no checksum. The third group includes barcode types having the lowest weight value, namely the Code 11 and MSI without the self-checking function.

The weight value may be continuously accumulated to form a total weight value of weight values. After the recognition of each sampled barcode pattern is completed, according to the matched barcode type of each image sample, the control module 130 of the barcode recognition apparatus 100 assigns a weight value to the corresponding barcode type. And the weight value is accumulated by the barcode recognition apparatus 100 to form a total weight value of the barcode type in the single recognition round.

Each barcode type is assigned with a total weight threshold. When the total weight value of weight values reaches the total weight threshold, the control module 130 of the barcode recognition apparatus 100 determines that the barcode type with the total weight value reaching the total weight threshold is the barcode type of the barcode pattern.

After Step 102 of determining the weight value and total weight threshold, the barcode recognition apparatus 100 instructs the user through the display panel 141 or voice to move the barcode recognition apparatus 100 near the barcode pattern to be recognized, that is, to align the image capture module 110 with the barcode pattern to be recognized.

In a preview mode, the image capture module 110 captures images in a dynamic photographing mode, and automatically samples and returns 15 to 30 frames per second as the sampled image samples. Meanwhile, the control module 130 caches the latest sampled image samples in a caching buffer in the program memory 121, and at the same time, the control module 130 drives the display panel 141 to display a preview image, so the user confirms whether the image capture module 110 is aligned with the barcode pattern to be recognized.

As shown in FIG. 2, after the user confirms that the image capture module 110 is aligned with the barcode pattern to be read, the barcode recognition apparatus 100 performs the process of barcode pattern sampling, recognizing and scoring in a single recognition round (Step 200). According to the sampling number M of the samples, the control module 130 of the barcode recognition apparatus 100 performs sampling on the barcode pattern M times to obtain M image samples. And then the barcode recognition apparatus 100 compares and recognizes each image sample, and gives a weight value to each image sample. Each image sample is only compared with N barcode types and recognized to discover the barcode type and barcode information corresponding to the barcode pattern to be recognized as the recognition result.

After the recognition of a barcode pattern is completed and the recognition result is obtained, the control module 130 of the barcode recognition apparatus 100 displays the inquiry message through the display panel 141 to confirm whether the user carries out the process of barcode pattern in a next recognition round (Step 103). The user sends an operation instruction to the control module 130 through an input interface 150 or a touch-control panel 142 to determine whether to carry out the barcode pattern recognition in the next recognition round or terminate the barcode recognition program 172.

The process of barcode pattern sampling, recognizing and scoring in a single recognition round in Step 200 is illustrated in the following paragraphs.

Figure 3:
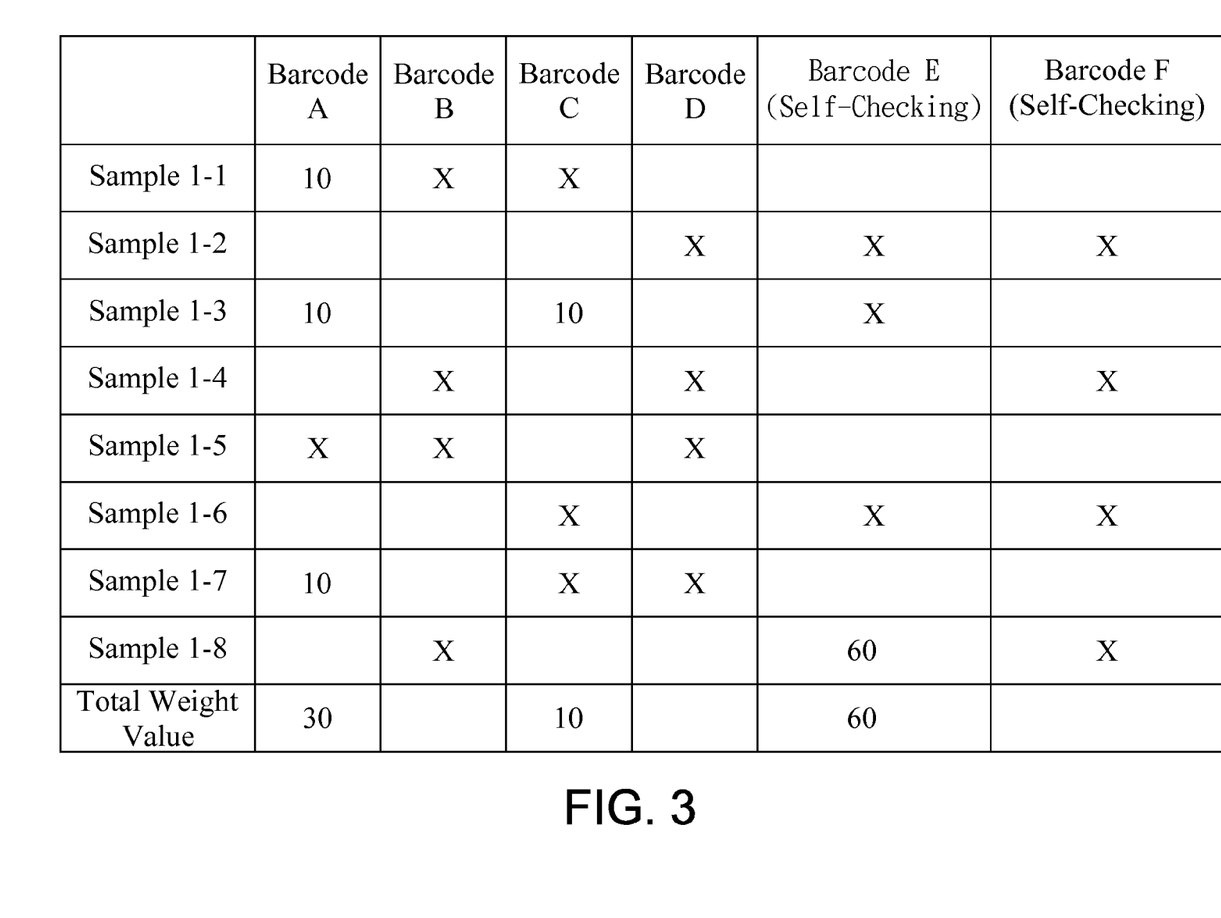
FIG. 3 illustrates a sample weight value table according to a specific embodiment of the present invention.

Please refer to FIGS. 1 and 3, a sample weight value table is stored in the program memory 121 of the data storage device 120. The barcode types supported by the barcode recognition apparatus 100 are recorded in the horizontal axis of the sample weight value table and, the sampled image samples obtained in each sampling are recorded in the vertical axis of the sample weight value table. Each sampled image sample may be marked X-Y, that is, the Yth sampling in the Xth recognition round. The Y is smaller or equal to the sampling number M of the samples in a single recognition round.

For example, in FIG. 3, the image samples in the 1st to 8th sampling in the 1st recognition round are recorded. After each sampling and comparison, the barcode type is assigned a weight value when the comparison matches, and each weight value and the previous weight value are accumulated to obtain a total weight value. The barcode type that the comparison does not match is marked to be failed or assigned a weight value 0, and the barcode type without comparison is not recorded. The above two conditions will not change the total weight value of the barcode type.

Figure 4:
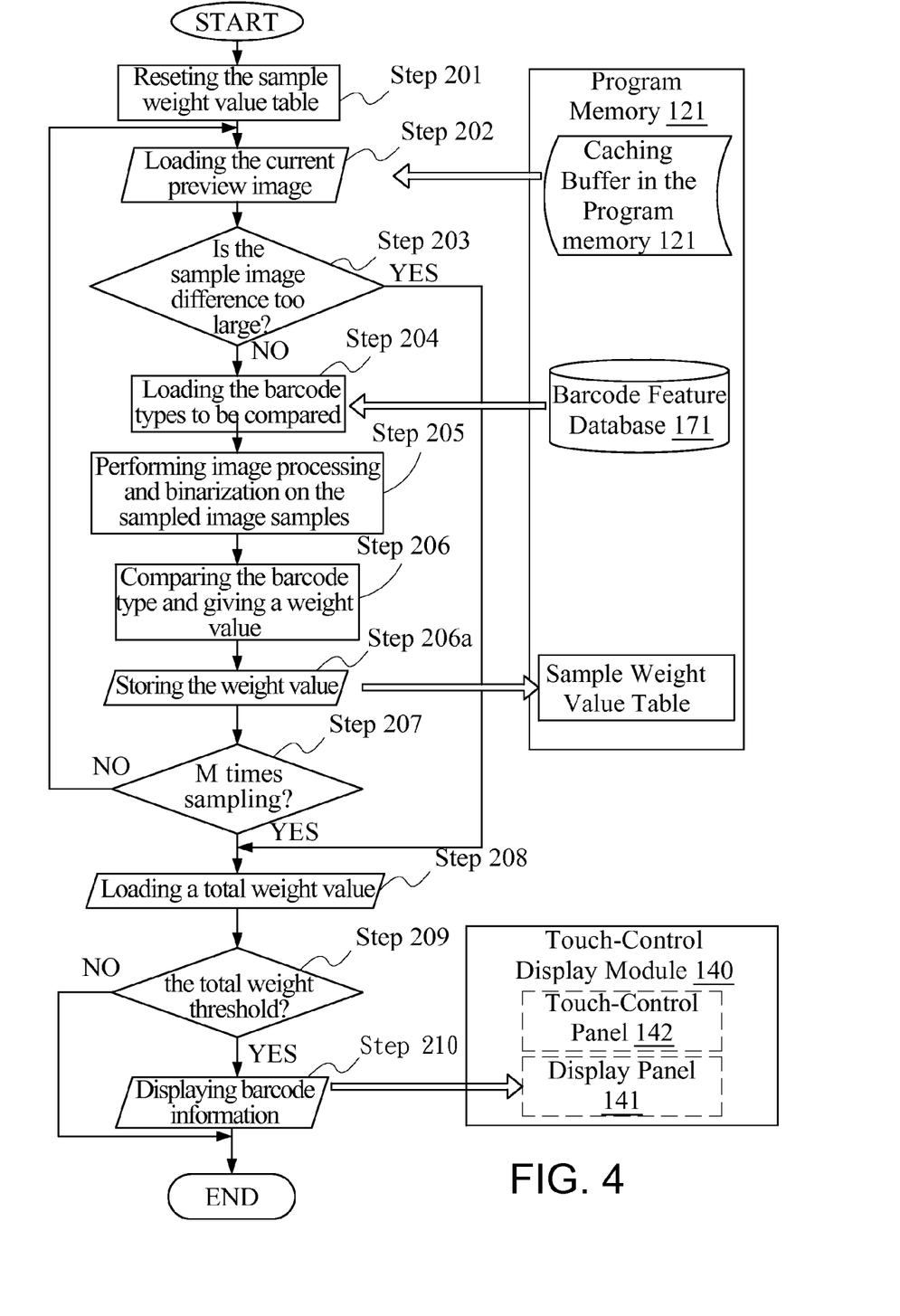
FIG. 4 is a flow chart of executing barcode pattern sampling, recognizing, and scoring in a single recognition round in the method according to the present invention.

As shown in FIG. 4, after a recognition round starts, the control module 130 of the barcode recognition apparatus 100 firstly resets the sample weight value table, clears records of all weight values, total weight values and sampled image samples, and fills in new serial numbers of the sampled image samples again according to the number of recognition rounds and the number M of the samples, as shown in Step 201.

Next, the control module 130 loads the current preview image or reads a photo from the program memory 121 of the data storage device 120 as a sampled image sample, as shown in Step 202.

The aforementioned preview image refers to a segment cached in the program memory 121 by the image capture module 110 as the buffer during dynamic continuous photographing. Normally, the cached of the dynamic image occupies a certain storage size, and the previously captured image is displayed by the display panel 141 driven by the control module 130 in a first-in-first-out matter and is deleted. At this time, the user may confirm whether the image capture module 110 is aligned with the barcode pattern to be recognized through the preview image displayed by display panel 141.

If the image capture module 110 operates in a mode of continuously recording single photos, the control module 130 loads a photo approximately corresponding to current time among the continuous single photos. Or the control module 130 selects a photo that has not been compared from a series of photos captured according to the time sequence as the sampled image sample. Only N from L barcode types are compared in each comparison rather than all of the barcode types, and it is practical for one photo to be compared twice or more. The number of times of repeated comparison performed on a sampled image sample is determined by N, such that after the repeated comparison each barcode type in the L barcode types is compared once, thereby avoiding repeated comparison of the same barcode type of one sampled image sample.

As shown in Step 203, if the comparison is not the first comparison in this recognition round, that is, the image sample is not the first sampled image sample, the control module 130 first compares the currently sampled image sample with the previously sampled image sample to determine whether the sample image difference is too large and exceeds a pre-defined allowable image difference value. If the sample image difference is too large and exceeds the allowable image difference value, the previously and currently sampled image samples are not from the same barcode pattern. That is to say, the image capture module 110 is no longer aligned with the barcode pattern to be recognized, so the control module 130 abandons the image sample sampled this time, directly terminates the loop of Steps 202 to 207, stops the steps of determining the barcode type of the image sample and giving a weight value to the barcode type. The control module 130 terminates the steps of barcode pattern sampling, recognizing and scoring in this recognition round and directly confirms a total weight value of each barcode type in Step 208.

If the difference is within the allowable range, the control module 130 loads the barcode feature data 171*a* to 171*n* of N barcode types to be compared from the barcode feature database 171 as a combination of barcode types to be compared, as shown in Step 204.

As described above, N barcode feature data 171*a* to 171*n* are randomly selected by the control module 130 or set by the user in advance through the input interface 150 or touch-control panel 142, as shown in Step 101 in FIG. 2.

In Step 205, the control module 130 starts to perform location, image processing, and binarization on the sampled image samples. The location and image processing are to capture the barcode area occupied by the barcode pattern in the sampled image sample. The binarization includes transforming the barcode pattern into a binary sequence for determining the barcode type of each image sample.

Next, in Step 206, the control module 130 compares the barcode type and gives a weight value. The control module 130 stores the weight value in the sample weight value table to update the total weight value, as shown in Step 206*a*.

In practice, the barcode feature data 171*a* to 171*n* in the barcode feature database 171 are the binary sequence corresponding to the barcode of various barcode types. The control module 130 may compare the binarized barcode pattern with the barcode feature data 171*a* to 171*n* of the selected N barcode types one by one, so as to discover the barcode type matching the type of the barcode pattern to be recognized, thereby determining the barcode type of the barcode pattern and obtaining the barcode information.

As shown in Step 206a, according to the matched barcode type of each image sample, the control module 130 gives a weight value to the matched barcode type and stores the weight value into the sample weight value table of the program memory 121 (as shown in FIG. 3). The control module 130 further accumulates the weight value and the previous weight value to update the total weight value of the barcode type. The scoring principle is as discussed previously. The barcode type when the comparison matches is given a corresponding weight value. The barcode type when the comparison does not match is assigned a weight value of 0 or marked as failed or not recorded at all.

After the comparison and scoring are complete, the control module 130 firstly determines whether or not the M times sampling as determined in Step 101 are complete, as shown in Step 207. If not the process returns to Step 202, and the control module 130 reloads the current preview image or reads a next photo.

If the M times sampling as determined in Step 101 are completed, the control module 130 loads the weight value result from the sample weight value table of the program memory 121, that is, loads a total weight value of each barcode type, as shown in Step 208.

As shown in Step 209, next, the control module 130 reads the sample weight value table in the program memory 121, determines that one of the supported barcode types with a total value reaching the total weight threshold from the total weight values of the barcode types is the barcode type of the barcode pattern. If not, the control module 130 determines that this recognition round is failed, terminates this recognition round, and turns to Step 103 in FIG. 2.

If the barcode type with the total weight value reaching the total weight threshold exists, the control module 130 takes the barcode type with the total weight value reaching the total weight threshold as the barcode type of the barcode pattern to be recognized, and drives the display panel 141 to display the barcode type and barcode information of the barcode pattern, so as to output a recognition result of the barcode pattern, as shown in Step 210.

Subsequently, as shown in FIG. 2, the control module 130 terminates the sub-loop of Step 200 and turns to Step 103. The display panel 141 displays the inquiry message to confirm whether the user wants to carry out the barcode pattern reading process in the next round.

In Step 210, if a plurality of barcode types with total weight values reaching the total weight threshold exists, the control module 130 preferably takes the barcode type with a higher total weight value or with the self-checking function or with the checksum as the barcode type of the barcode pattern to be recognized. If the total weight values are the same, the control module 130 preferably takes the barcode type with the self-checking function or the checksum as the barcode type of the barcode pattern to be recognized. The priority sequence of the same total weight values may also be designated in advance.

In the embodiment of FIG. 3, the barcode recognition apparatus 100 can recognizes the barcode pattern of 6 barcode types: Barcode A, Barcode B, Barcode C, Barcode D, Barcode E, and Barcode F, in which the Barcode E and the Barcode F have the self-checking function.

As shown in FIG. 2, first, after the control module 130 of the barcode recognition apparatus 100 loads and executes a barcode recognition program 172 from the storage memory 122 of the data storage device 120. And then, the barcode recognition apparatus 100 executes Step 101 and estimates the computational capability of the barcode recognition apparatus 100, thereby determining the sampling number M of the samples in a single recognition round is 8 and the number N of barcode types that are compared in each sampling is 3.

As shown in Step 102, the barcode recognition apparatus 100 determines the weight value obtained when the comparison between the Barcode A, Barcode B, and Barcode C and the barcode pattern matches is 10, and the weight value is 60 for the Barcode E and the Barcode F as the Barcode E and the Barcode F have the self-checking function. Meanwhile, the total weight threshold of the barcode types is finally determined to be 60.

As shown in FIG. 4, the following step is the sub-loop of the steps of barcode pattern sampling, recognizing and scoring in a single recognition round (Step 200).

As shown in Step 201, the control module 130 of the barcode recognition apparatus 100 resets the sample weight value table at first, so as to clear all the records of weight values, total weight values, and sampled image samples, and only the marks of the Barcode A, Barcode B, Barcode C, Barcode D, Barcode E, Barcode F are left. Meanwhile, as the number of rounds is 1 and the sampling number of the samples is 8, the control module 130 fills in new serial numbers of the sampled image samples: Sample 1-1, Sample 1-2, Sample 1-3, Sample 1-4, Sample 1-5, Sample 1-6, Sample 1-7, and Sample 1-8.

Next, the control module 130 loads the current preview image or reads a photo from the program memory 121 of the data storage device 120 as a sampled image sample, as shown in Step 202.

As shown in Step 203, if the comparison is not the first comparison in this recognition round, that is, the image sample is not the first sampled image sample, the control module 130 firstly compares the currently sampled image sample with the previously sampled image sample to determine whether the sample image difference is too large and exceeds a pre-defined allowable image difference value. If the sampled image difference is within the allowable range, the control module 130 loads the barcode feature data 171a to 171n of the 3 barcode types to be compared from the barcode feature database 171 as a combination of barcode types to be compared, as shown in Step 204.

Next, in Steps 205 and 206, the control module 130 starts to perform location, image processing, and binarization on the sampled image samples, so as to perform comparison and scoring on the barcode type.

Taking Sample 1-1 as an example, when the comparison matches is the Barcode A, a weight value of 10 is given to the Barcode A. The rest barcode types which are not compared and the types when the comparison does not match are assigned a weight value 0 or are not marked.

Taking Sample 1-3 as an example, when the comparison matches is the Barcode A, a weight value of 10 is given to the Barcode A. The weight value 10 obtained by the Barcode A and the previous weight value are accumulated so that the Barcode A obtains a total weight value 20.

Taking Sample 1-7 as an example again, when the comparison matches is the Barcode A, a weight value of 10 is given to the Barcode A. The weight value 10 obtained by the Barcode A and the previous weight value are accumulated so that the Barcode A obtains a total weight value 30.

The total weight values of the rest barcode types Barcode B and Barcode C are obtained according to the same principle, and after the sampling and comparison of Samples 1-1 to 1-8 are completed, the condition of ending the loop of Step 207 is reached. The control module 130 loads the weight value result from the sample weight value table of the program memory 121, as shown in Step 208.

In Step 209, next the control module 130 reads the sample weight value table in the program memory 121, and determines one barcode type with a total value reaching the total weight threshold from the total weight values of the barcode types. At this time, the control module 130 determines that the Barcode E reaches the total weight threshold. The control module 130 takes the Barcode E as the barcode type of the barcode pattern to be recognized, and drives the display panel 141 to display the barcode type and barcode information of the barcode pattern, as shown in Step 210.

If both the Barcode A and Barcode E reach the total weight threshold, for example, the Barcode A has a total weight value of 60 and the Barcode E also has a total weight value of 60, as the Barcode E has a higher total weight value or the Barcode E has the self-checking function or the checksum, the control module 130 determines the Barcode E as the barcode type of the barcode pattern to be recognized.

Therefore, the barcode recognition method capable of improving a multi-type barcode recognition efficiency of the present invention is applicable to the barcode recognition apparatus 100 based on a dynamic image capturing or high-speed continuous shooting function. With the dynamic image capturing or high-speed continuous photographing function, the barcode recognition apparatus 100 automatically samples the samples to be compared multiple times per second. After a plurality of sampled image samples is obtained, for a sample obtained each time, only a part of the barcode types are compared and a weight value is assigned, which improves the efficiency of the barcode recognition. Through the mechanisms of weight values and total weight values, the barcode type is determined based on whether the total weight threshold is reached, so as to guarantee the correct rate when multi-type barcodes are being recognized.

Based on the method above, the present invention further provides a computer readable medium, which stores a barcode recognition program 172 for a barcode recognition apparatus 100 to load and then execute the following method. The barcode recognition apparatus 100 determines a weight value obtained when the comparison between each barcode type in a plurality of barcode types and a barcode pattern matches and a total weight threshold. The barcode recognition apparatus 100 samples the barcode pattern multiple times to obtain a plurality of image samples. The barcode recognition apparatus 100 also executes the following steps on each image sample: determining the barcode type of each image sample; and according to the matched barcode type of each image sample, assigning a weight value to the barcode type, and accumulating the weight value to acquire a total weight value of the barcode type. Finally, the barcode recognition apparatus 100 determines that the barcode type with a total value reaching the total weight threshold is the barcode type of the barcode pattern, and according to the barcode type, outputs a recognition result of the barcode pattern. The details of all the steps are the same as the method above, the description of which is omitted here.

What is claimed is:

1. A method of improving multi-type barcode recognition efficiency using continuous sampling, for sampling a barcode pattern multiple times and recognizing one of a plurality of barcode types of the barcode pattern and corresponding barcode information, comprising the following steps:
   (a) determining a weight value obtained when comparison between each barcode type and the barcode pattern matches and a total weight threshold;
   (b) sampling the barcode pattern multiple times to obtain a plurality of image samples, and executing following steps on each image sample:
      (b1) determining the barcode type of each image sample; and
      (b2) according to the matched barcode type of each image sample, assigning a weight value to the barcode type and accumulating the weight value to acquire a total weight value of the barcode type;
   (c) determining the barcode type with the total weight value reaching the total weight threshold as the barcode type of the barcode pattern and outputting a recognition result of the barcode pattern according to the barcode type.

2. The method as claimed in claim 1, wherein the steps for determining the barcode type of each image sample comprises:
   capturing a barcode area containing the barcode pattern in the sampled image sample;
   executing a binarization process to transform the barcode pattern into a binary sequence; and
   determining the barcode type of each image sample according to the binary sequence.

3. The method as claimed in claim 1, further comprising a step for determining a sampling number of the image samples and a number of barcode types with which each image sample is required to be compared.

4. The method as claimed in claim 1, further comprising a step for determining a reasonable program response time and then, according to a following formula, determining a sampling number of the image samples and a number of barcode types with which each image sample is required to be compared:

$$(\text{the number of the samples}) \times (\text{the number of barcode types with which each image sample required to be compared}) \times (\text{an average time for comparison between each image sample and a barcode type}) < \text{the reasonable program response time}.$$

5. The method as claimed in claim 1, wherein a weight value assigned to a barcode type having self-checking ability is higher than a weight value assigned to a barcode type without self-checking ability.

6. The method as claimed in claim 1, wherein a weight value assigned to the barcode type having a checksum is higher than a weight value assigned to the barcode type without the checksum.

7. The method as claimed in claim 1, further comprising a step for defining an allowable image difference value and when a difference between two sampled image samples is higher than the image difference value, stopping determining the barcode type of each image sample and giving the weight value to the barcode type.

8. A computer readable medium, storing a barcode recognition program for a barcode recognition apparatus to read and then executing following steps:
   (a) determining a weight value obtained when comparison between each of a plurality of barcode types and a barcode pattern matches and a total weight threshold;
   (b) sampling the barcode pattern multiple times to obtain a plurality of image samples, and executing following steps on each image sample:
      (b1) determining the barcode type of each image sample; and
      (b2) according to the matched barcode type of each image sample, assigning a weight value to the barcode type and accumulating the weight value to acquire a total weight value of the barcode type;
   (c) determining the barcode type with the total weight value reaching the total weight threshold as the barcode type of the barcode pattern and outputting a recognition result of the barcode pattern, according to the barcode type.

9. The computer readable medium as claimed in claim 8, wherein the steps for determining the barcode type of each image sample comprises:
   capturing a barcode area of the barcode pattern in the sampled image sample;
   executing a binarization process to transform the barcode pattern into a binary sequence; and
   determining the barcode type of each image sample according to the binary sequence.

10. The computer readable medium as claimed in claim 8, further comprising a step for determining a sampling number of the image samples and a number of barcode types with which each image sample is required to be compared.

11. The computer readable medium as claimed in claim 10, further comprising a step for determining a reasonable program response time, and then, according to a following formula, determining the sampling number of the image samples and the number of barcode types with which each image sample required to be compared:

(the number of the samples)×(the number of barcode types with which each image sample required to be compared)×(an average time for comparison between each image sample and a barcode type) <the reasonable program response time.

12. The computer readable medium as claimed in claim 8, wherein a weight value assigned to a barcode type having a self-checking ability is higher than a weight value assigned to a barcode type without the self-checking ability.

13. The computer readable medium as claimed in claim 8, wherein a weight value assigned to the barcode type having a checksum is higher than a weight value assigned to the barcode type without the checksum.

14. The computer readable medium as claimed in claim 8, further comprising defining an allowable image difference value and when a difference between two sampled image samples is higher than the image difference value, stopping determining the barcode type of each image sample and assigning a weight value to the barcode type.

15. A barcode recognition apparatus, for sampling a barcode image multiple times and recognizing one of a plurality of barcode types of a barcode pattern and corresponding barcode information, and the barcode recognition apparatus comprising:
   an image capture module, for continuously capturing images of the barcode pattern as a plurality of image samples;
   a data storage device, for caching the image samples, and storing at least a barcode recognition program, a weight value obtained when comparison between each barcode type and the barcode pattern matches, and a total weight threshold; and
   a control module, loading and executing the barcode recognition program from the data storage device to control the image capture module to start capturing the image samples and transmit the captured images to the control module;
   wherein the barcode recognition apparatus is arranged such that the control module obtains a plurality of image samples from the image capture module to determine the barcode type of each image sample; provides a weight value to the barcode type and accumulates the weight value to acquire a total weight value of the barcode type according to the matched barcode type of each image sample; and determines the barcode type with the total weight value reaching the total weight threshold as the barcode type of the barcode pattern and outputs a recognition result of the barcode pattern according to the barcode type.

16. The barcode recognition apparatus as claimed in claim 15, wherein the image capture module continuously captures images of barcode pattern at a fixed number of frames per second to form a dynamic image, and the dynamic image is split into a plurality of continuously captured images as the image samples.

17. The barcode recognition apparatus as claimed in claim 15, wherein the image capture module continuously captures multiple single photos of the barcode pattern to obtain a plurality of single photos as a plurality of sampled image samples.

18. The barcode recognition apparatus as claimed in claim 15, wherein the data storage device stores a plurality of barcode feature data, and each barcode feature data corresponds to one of the barcode types.

19. The barcode recognition apparatus as claimed in claim 15, further comprising a display panel for displaying image frames by receiving display signals of the control module.

20. The barcode recognition apparatus as claimed in claim 19, further comprising a touch-control panel combined with the display panel, wherein the touch-control panel is touched to send a corresponding operation instruction to the control module.

21. The barcode recognition apparatus as claimed in claim 19, further comprising an input interface, for sending an operation instruction to the control module.

22. The barcode recognition apparatus as claimed in claim 15, wherein the control module estimates a computational capability of the barcode recognition apparatus, and then, according to the computational capability, determines a sampling number of the image samples and a number of barcode types with which each image sample needs to be compared.

* * * * *